(12) United States Patent
Yaniv et al.

(10) Patent No.: US 6,336,653 B1
(45) Date of Patent: *Jan. 8, 2002

(54) INFLATABLE TUBULAR KNEE BOLSTER

(75) Inventors: Gershon Yaniv, Scottsdale, AZ (US); David J. Romeo, Etna, WY (US); Dirk J. Hardtmann, Phoenix, AZ (US)

(73) Assignee: Simula, Inc., Phoenix, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,122

(22) Filed: May 21, 1997

Related U.S. Application Data
(60) Provisional application No. 60/017,194, filed on May 22, 1996.

(51) Int. Cl.$^7$ ................................................ B60R 21/22
(52) U.S. Cl. ..................................... 280/730.1; 280/732
(58) Field of Search .......................... 280/730.1, 730.2, 280/732, 753

(56) References Cited

U.S. PATENT DOCUMENTS

| | | |
|---|---|---|
| 2,834,606 A | 5/1958 | Bertrand |
| 3,040,383 A | 6/1962 | Nassimbene |
| 3,316,337 A | 4/1967 | North |

(List continued on next page.)

FOREIGN PATENT DOCUMENTS

| | | |
|---|---|---|
| DE | 38 20 145 A1 | 11/1990 |
| DE | 92 11 423 | 8/1992 |
| DE | 42 38 427 A1 | 5/1993 |
| DE | 423 07 175 A1 | 9/1993 |
| DE | 295 17 953 U1 | 2/1996 |
| FR | 2442058 | 6/1980 |
| FR | 2606719 | 5/1988 |
| FR | 2675098 | 10/1992 |
| GB | 1320475 | 6/1973 |
| GB | 1381999 | 1/1975 |
| GB | 2191450 | 12/1987 |

(List continued on next page.)

OTHER PUBLICATIONS

Arizona Republic Newspaper, "Car Air Bags for Side Hits in the Works," Mar., 1994.

Aviation Week and Space Technology, "Army Develops Crew Restraint System," vol. 120, No. 3, Jan. 16, 1984, New York, USA, p. 187.

Japanese Patent Abstract No. 111 vol. 16 of Patent No. A–3 281 455 to Hideki, issued on Dec. 12, 1991.

Livbag product brochure, "Specifications for Euroflator Gas Generator and Safety Data Sheet," Aug., 1992.

Popular Science, "Side Protection Coming," Dec., 1993.

*Primary Examiner*—Peter C. English
(74) *Attorney, Agent, or Firm*—Shaw Pittman LLP

(57) ABSTRACT

This invention is an Inflatable Tubular Bolster (ITB) which prevents or limits injury to an occupant of a motor vehicle due to a frontal or semi-frontal crash. In particular, the invention protects the front seat occupant's legs and lower torso by providing a cushioned barrier that absorbs impact energy and restricts the occupant's lower body from moving forward and into or underneath the instrument panel and toward the foot well. This invention can be effective in any vehicle where an occupant's lower body is subject to crash injury from a dashboard, instrument panel, or similar structure.

30 Claims, 9 Drawing Sheets

U.S. PATENT DOCUMENTS

| | | | |
|---|---|---|---|
| 3,642,303 | A | 2/1972 | Irish et al. |
| 3,682,498 | A | 8/1972 | Rutzki |
| 3,687,485 | A | 8/1972 | Campbell |
| 3,730,551 | A | 5/1973 | Sack et al. |
| 3,784,223 | A | 1/1974 | Hass et al. |
| 3,792,873 | A | 2/1974 | Buchner et al. |
| 3,807,754 | A | 4/1974 | Rodenbach et al. |
| 3,841,654 | A | 10/1974 | Lewis |
| 3,844,581 | A | 10/1974 | Fox |
| 3,866,940 | A | 2/1975 | Lewis |
| 3,888,503 | A | 6/1975 | Hamilton |
| 3,888,504 | A | 6/1975 | Bonn et al. |
| 3,892,425 | A | 7/1975 | Sakairi et al. |
| 3,905,615 | A | 9/1975 | Schulman |
| 3,929,205 | A | 12/1975 | Takada et al. |
| 3,948,541 | A | 4/1976 | Schulman |
| 3,953,049 | A | 4/1976 | Surace et al. |
| 3,953,640 | A | 4/1976 | Takada |
| 3,970,329 | A | 7/1976 | Lewis |
| 4,348,037 | A | 9/1982 | Law et al. |
| 4,592,523 | A | 6/1986 | Herndon |
| 4,805,930 | A | 2/1989 | Takada |
| 4,921,735 | A | 5/1990 | Bloch |
| 4,971,354 | A | 11/1990 | Kim |
| 5,018,762 | A | 5/1991 | Suzuki et al. |
| 5,039,035 | A | 8/1991 | Fitzpatrick |
| 5,062,662 | A | 11/1991 | Cameron |
| 5,251,931 | A | 10/1993 | Semchena et al. |
| 5,282,648 | A | 2/1994 | Peterson |
| 5,303,953 | A | 4/1994 | Kamiyama et al. |
| 5,312,131 | A | 5/1994 | Kitagawa et al. ........ 280/730.1 |
| 5,322,322 | A | 6/1994 | Bark et al. ............... 280/730.2 |
| 5,346,250 | A | 9/1994 | Kamiyama |
| 5,354,096 | A | 10/1994 | Tanaka et al. |
| 5,383,713 | A | 1/1995 | Kamiyama et al. |
| 5,385,367 | A | 1/1995 | Tanaka et al. |
| 5,390,953 | A | 2/1995 | Tanaka et al. |
| 5,393,091 | A | 2/1995 | Tanaka et al. |
| 5,445,411 | A | 8/1995 | Kamiyama et al. |
| 5,446,003 | A | 8/1995 | Augustine et al. |
| 5,464,246 | A | 11/1995 | Castro et al. ............ 280/730.2 |
| 5,465,999 | A | 11/1995 | Tanaka et al. |
| 5,466,002 | A | 11/1995 | Tanaka et al. |
| 5,480,181 | A | 1/1996 | Bark et al. ............... 280/730.2 |
| 6,017,059 | A * | 1/2000 | Taubenberger et al. .. 280/730.1 |

FOREIGN PATENT DOCUMENTS

| | | |
|---|---|---|
| GB | 2261636 | 5/1993 |
| GB | 2262720 | 6/1993 |
| JP | 1-156155 | 6/1989 |
| JP | 2-237837 | 9/1990 |
| JP | 3-92451 | 4/1991 |
| JP | 3-276844 | 12/1991 |
| JP | 5-193430 | 8/1993 |
| JP | 5-208653 | 8/1993 |
| WO | WO90/11914 | 10/1990 |
| WO | WO94/19215 | 9/1994 |

* cited by examiner

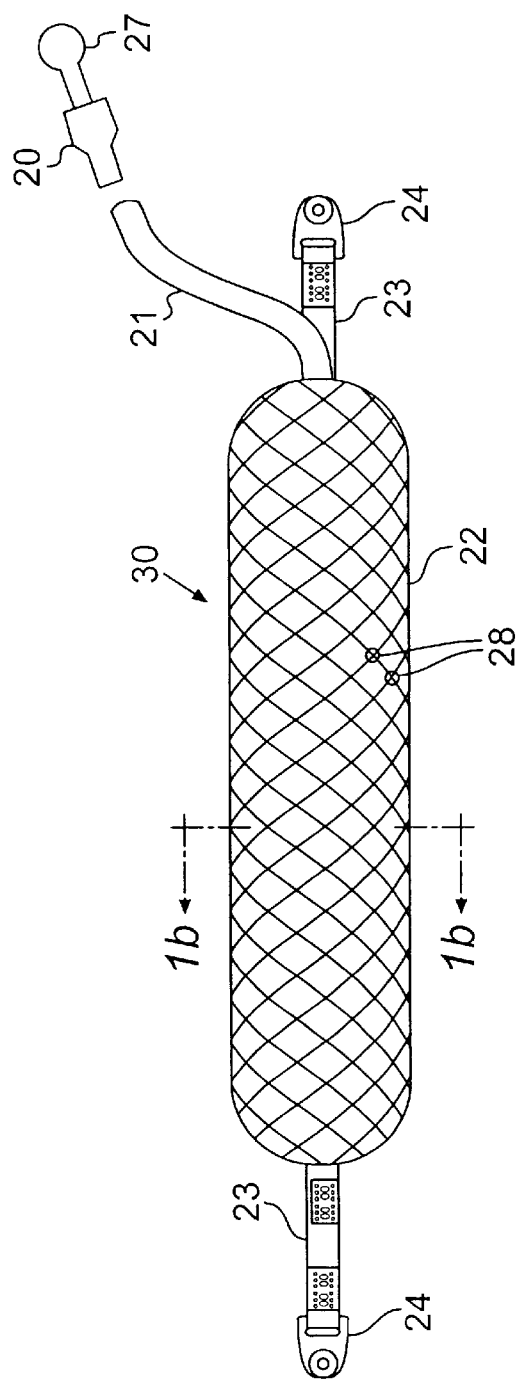
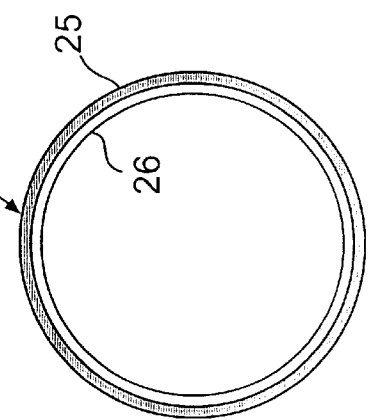

INFLATABLE TUBULAR KNEE BOLSTER

The present application claims the benefit of the filing date of U.S. Provisional Application Serial No. 60/017,194, filed on May 22, 1996.

BACKGROUND OF THE INVENTION

1. Field of the Invention

This invention relates to safety apparatus for protecting the legs and lower torso of the occupant of a motor vehicle to reduce the extent and severity of injuries sustained during a crash. This invention more specifically relates to using an inflatable bolster to restrain the occupant's legs and lower torso during a survivable crash.

2. Background of the Invention

During a frontal impact, the occupant moves forward due to the inertia and kinematics of the crash while the front components of the vehicle structure (bumper, hood, engine cavity) begin to collapse. Knee and leg injuries occur when the body of an occupant slides or submarines forward and/or downward and the occupant's knees hit the instrument panel or structure beneath the panel. Further injuries occur when the occupant's lower torso and legs move forward such that the knees are trapped in or beneath the instrument panel just before the foot well begins to collapse. As the foot well collapses, it pushes the occupant's feet backward, causing the knees to elevate and become further trapped. As the foot well continues to crush, the loads on the trapped legs increase and cause foot, ankle, and tibia injuries. These injuries are common even with fixed knee bolsters designed to meet present knee injury criteria requirements.

Abdominal and lower torso injuries can be inflicted by the lap and lower part of the torso belts as they ride upward on the soft tissue of the occupant's torso when he slides forward and downward due to the forces of the frontal crash.

SUMMARY OF THE INVENTION

The present invention, inflatable tubular bolster (ITB), protects the knees, femurs and lower torso as well as the feet, ankles, and lower legs of the occupant by creating an inflatable restraint that deploys in front of the occupant's knees and inhibits forward and downward movement by the occupant during a frontal crash. It protects by preventing the knees from becoming trapped in or underneath the dashboard. Further, by transferring energy from the lower torso of the occupant through the femur and knees to the invention itself, this invention reduces the severity of injuries to those body parts as well. This invention also reduces the severity of lower torso injuries due to seat belt pressure by stabilizing the lower body and preventing the knees and legs from moving forward, thus allowing the seat belt to remain in its preferred position on the occupant.

The present invention improves egress and extraction of the occupant from a vehicle after a crash because it prevents the occupant from becoming wedged into or underneath the interior structure. Since this invention is smaller in size prior to being deployed, similar to an air bag, it does not intrude into or occupy significant space within the occupant compartment as does a conventional fixed knee bolster. This is a major advantage from not only the entry, egress and overall comfort viewpoints, but also from an aesthetic design consideration.

This invention is installed beneath or as part of the lower face of the dashboard. One end is rigidly attached to the vehicle side structure near the door while the other end is attached either to the center tunnel for single occupant use or to the other side of the vehicle for multiple occupant use. In the stowed position, the tube is flat and hidden from the occupant's line of sight. This invention is stowed around the upper perimeter of the leg space behind a piece of trim or under a split-seam in the dashboard face. Original equipment manufacturers will be able to install the system into current platforms and integrate the device into future platforms.

The gas generator which inflates the unit can be mounted remotely in a convenient location, such as forward in the dashboard using a flexible or combination rigid/flexible gas conduit to this invention.

In the event of a crash, a crash sensor signals the gas generator to ignite and discharge gas at a high mass flow rate into the gas conduit leading to the ITB. As the ITB inflates, its length significantly decreases as its diameter increases. The ITB becomes semi-rigid as inflation completes, and it pulls itself out of its stowed position downward and rearward into its functional position. Within about 12 to 25 ms after impact, the taut, tubular cushion positions itself in front of the occupant's knees, restrains forward and downward occupant movement, cushions the occupant from impact, and functions as a barrier between the occupant's knees and legs and the vehicle's structure. When the occupant hits the ITB, impact forces are transferred to the vehicle's structure through this invention webbing and hardware. When the impact has passed and the occupant is at rest, he relaxes the load on this invention and is very close to his initial position.

Unlike conventional inflatable restraints, this invention uses an inflatable braided tube of continuous high-strength fiber, as described in U.S. Pat. No. 5,480,181, which is incorporated herein by reference. These fibers seek an orientation that accommodates a greater volume within the tube when under pressure. Prior to inflation, the fiber spirals are stretched-out longitudinally and the tubular restraint has a relatively small diameter. During inflation, the spirals move closer together longitudinally to increase the braided tube's diameter and decrease its length, or contract.

The contraction in length of the braided tube during deployment and the consequently high tensile forces developed at its fixation points constitute a significant difference between the present invention and prior art. Uninflated, the orientation of the braided tube's fibers are at a longitudinal angle of 30 degrees to 70 degrees to each other. Though the fibers theoretically seek a maximum longitudinal angle of 110 degrees during inflation, in actual tests the post-inflation orientation is typically 100 degrees in an unloaded, or unconstrained tube. The range of typical contraction of the unconstrained inflatable tube is 21.5 percent (for the 70 to 100 degree change) to about 33.5 percent (for the 30 to 100 degree change).

The calculation for determining the amount of contraction occurring upon inflation in an unconstrained condition for the present invention is as follows:

$$Lf-Li=X$$

where:

$X$ is the amount of contraction $Lf$ is the length of flat, uninflated material $Li$ is the length of unconstrained inflated material, and θf is the longitudinal angle prior to inflation
θi is the longitudinal angle after inflation and Li/Lf=cos(θi/2)/cos(θf/2) hence Lf−Li=Lf(1−(cos(θi/2)/cos(θf/2)))

For example, an embodiment of the present invention having an uninflated length of 100 cm and constructed with fibers that cross each other at a 36 degree angle would decrease in length, or contract, to 67 cm, approximately 33 percent, upon inflation in an unconstrained condition. (The calculation assumes that the angle of the fibers in an unconstrained inflated braided tube will be 100 degrees.)

The present invention contracts as a result of both inflation and contraction, typically contracting 21.5 percent to 33.5 percent from the change in orientation of the fibers (construction) plus an additional small percentage (Lf−Li= Df(1−2/π)) as a result of the inflation pressure. Prior inventions, however, contract in length solely due to inflation, yielding a comparatively small contraction of approximately 7 to 10 percent. This greater contraction that this invention undergoes causes the restraint to be tighter and therefore develop high tensile forces at its fixation points. A tighter restraint is more resistant to deflection and allows more force to be directed through the webbing of this invention attachments to the vehicle structure. The occupant's knees, legs, and lower torso will therefore move less, and thus the occupant is less likely to be injured.

Another important difference between this invention and prior art is that the present invention can be installed without any reactive surface behind the invention. Most prior art restraint devices of this type require the dashboard to extend low enough to provide a reactive surface for either the knees or a conventional air bag. This invention does not require this additional surface area protruding from the dashboard since it is supported by the high tensile forces developed at its fixation points. This invention therefore allows more leg room for the occupant in its un-inflated condition, increasing occupant comfort and reducing the possibility that the occupant will be trapped beneath the dashboard during a crash. Because prior art restraint devices need strong reactive surfaces, the total system (module and support structure) can be heavy and/or bulky. The present invention does not include nor require a heavy support structure since it employs the already existing vehicle side structure and/or tunnel.

Fixed bolsters cannot provide optimal protection for both small and large occupants because seat positions vary. A small occupant, for example, sitting in a rearward seat position, as commonly occurs on the passenger side, will come off the seat prior to contacting a fixed bolster. The occupants can thus be injured by hitting the rigid padding or structure of the bolster. Since the present invention is a non-rigid structure, fewer injuries would result from hitting the bolster itself, and it can position itself further rearward than a fixed bolster and thus "catch" the small occupant's knees before the occupant comes off the seat. This invention deploys only in response to a crash sensor signal and thus does not hinder occupant movement and comfort when it is not needed for protection.

Lastly, the present invention may be inflated to a range of diameters depending on the particular vehicle installation. The typical inflation diameter is approximately 200 mm. This allows this invention a larger surface area for distribution of forces and occupant restraint than fixed knee bolsters. This large diameter fills the space in front of the occupant's legs very quickly and immediately provides a cushioned barrier that protects the lower torso, knees, and legs.

The present invention, therefore, is an important contribution to vehicular crashworthiness and occupant leg and torso protection in frontal impacts and is particularly a substantial improvement in inflatable vehicular knee bolsters.

DESCRIPTION OF THE FIGURES

FIG. 1a and 1b are schematic diagrams showing the main components of the preferred embodiment of the present invention.

DETAILED DESCRIPTION OF THE INVENTION

Figure 2:
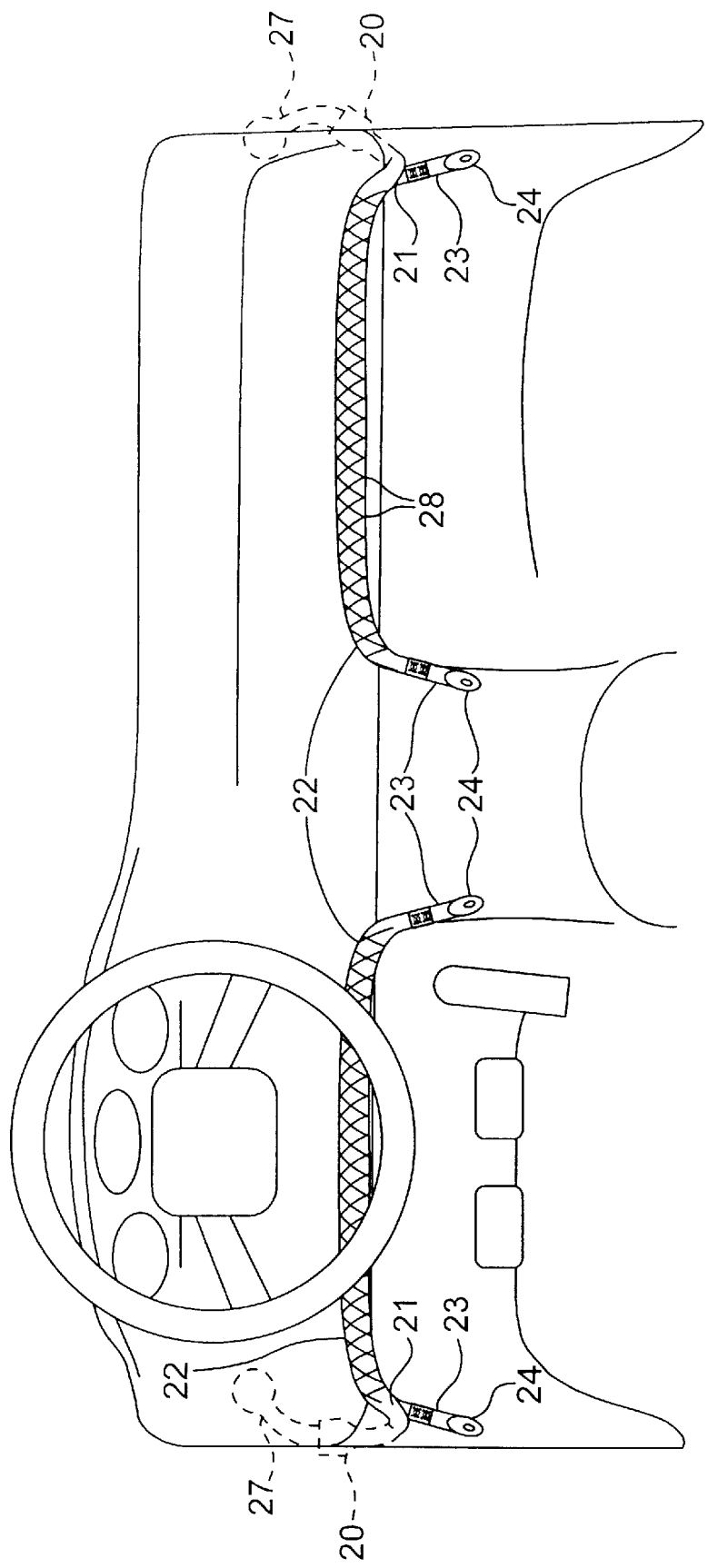
FIG. 2 is a schematic diagram of a top-rear view of a dual bolster embodiment of the present invention in its stowed position.

Preferred embodiments of the present invention (ITB) 30 are shown in FIGS. 1a and 1b, and FIGS. 2 through 9. FIG. 1a includes the main components of the invention, including gas generator and generator housing 20, crash sensor 27, gas conduit 21, braided tube 22 (in its inflated state), webbing 23, and attachment hardware 24. FIG. 1b is a cross section of the braided tube, taken at 1b—1b in FIG. 1a, which shows that braided tube 22 comprises an elastomeric liner 26 and a braided cover 25.

Figure 3:
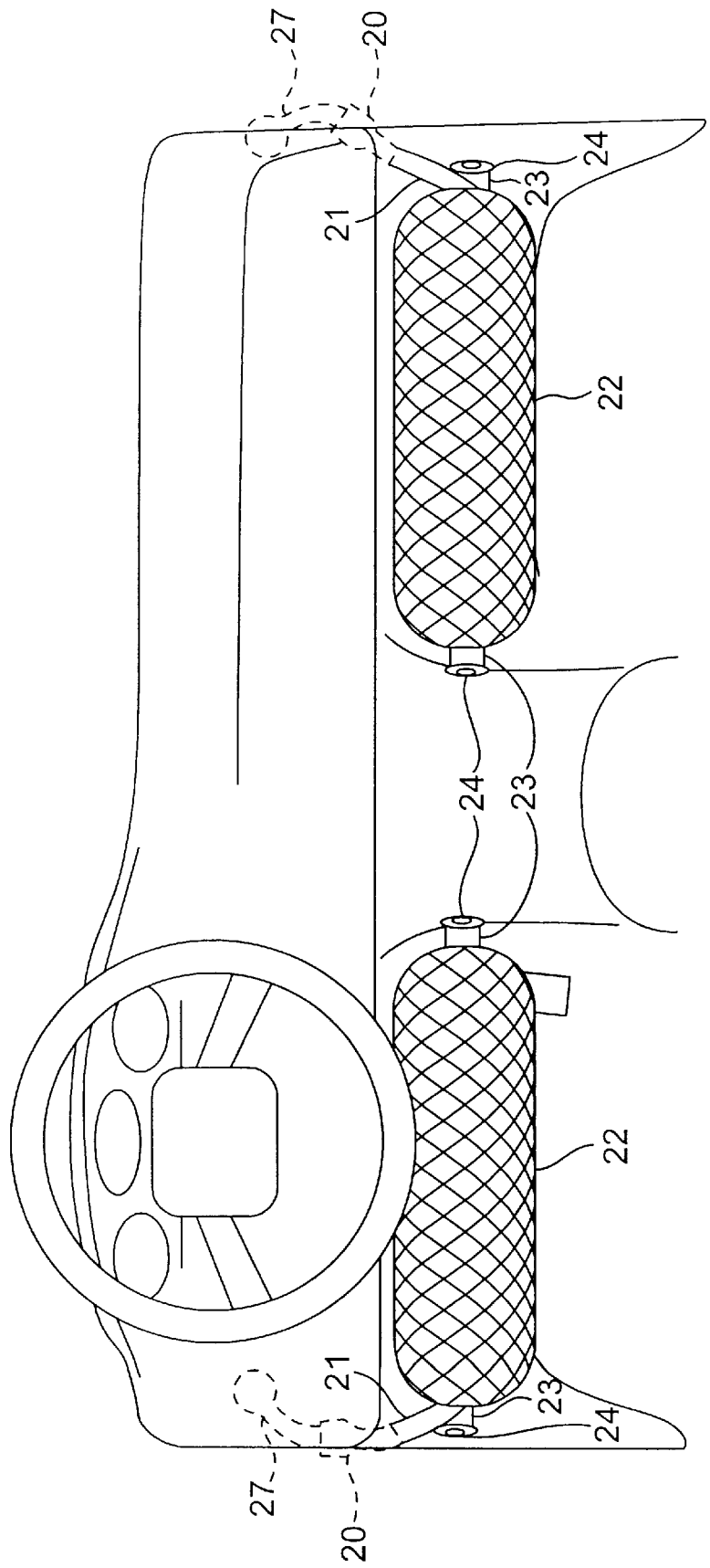
FIG. 3 is a schematic diagram of a top-rear view of an inflated dual bolster embodiment of the present invention.
Figure 4:
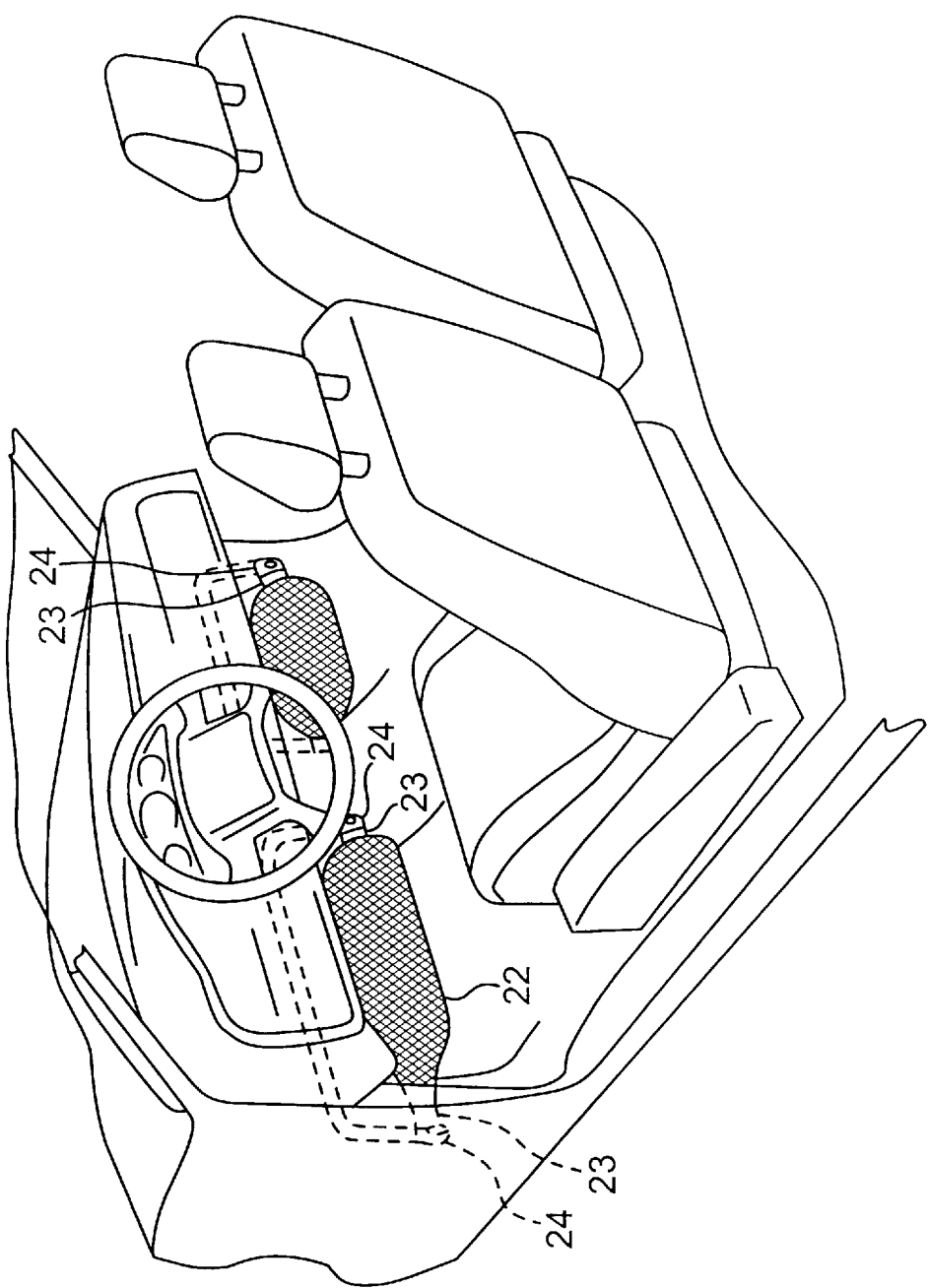
FIG. 4 is a schematic diagram of a top-left oblique view of an inflated dual bolster embodiment of the present invention.

FIGS. 2–4 show a dual-bolster preferred embodiment of the present invention in its stowed condition (FIG. 2) and after inflation (FIGS. 3–4).

As described in greater detail in U.S. Pat. No. 5,480,181 (incorporated herein by reference), in the stowed position shown in FIG. 2, braided tube 22 is elongated with its woven fibers forming spirals which form obtuse and acute angles at fiber crossing points 28. FIG. 4 is a perspective view showing the installation of a dual bolster system in a passenger compartment of a vehicle. These FIGS. 2 and 3 show attachment hardware 24, webbing 23, braided tube 22 and gas conduit 21. The dashed lines show the original position of the bolster prior to inflation.

Figure 5:
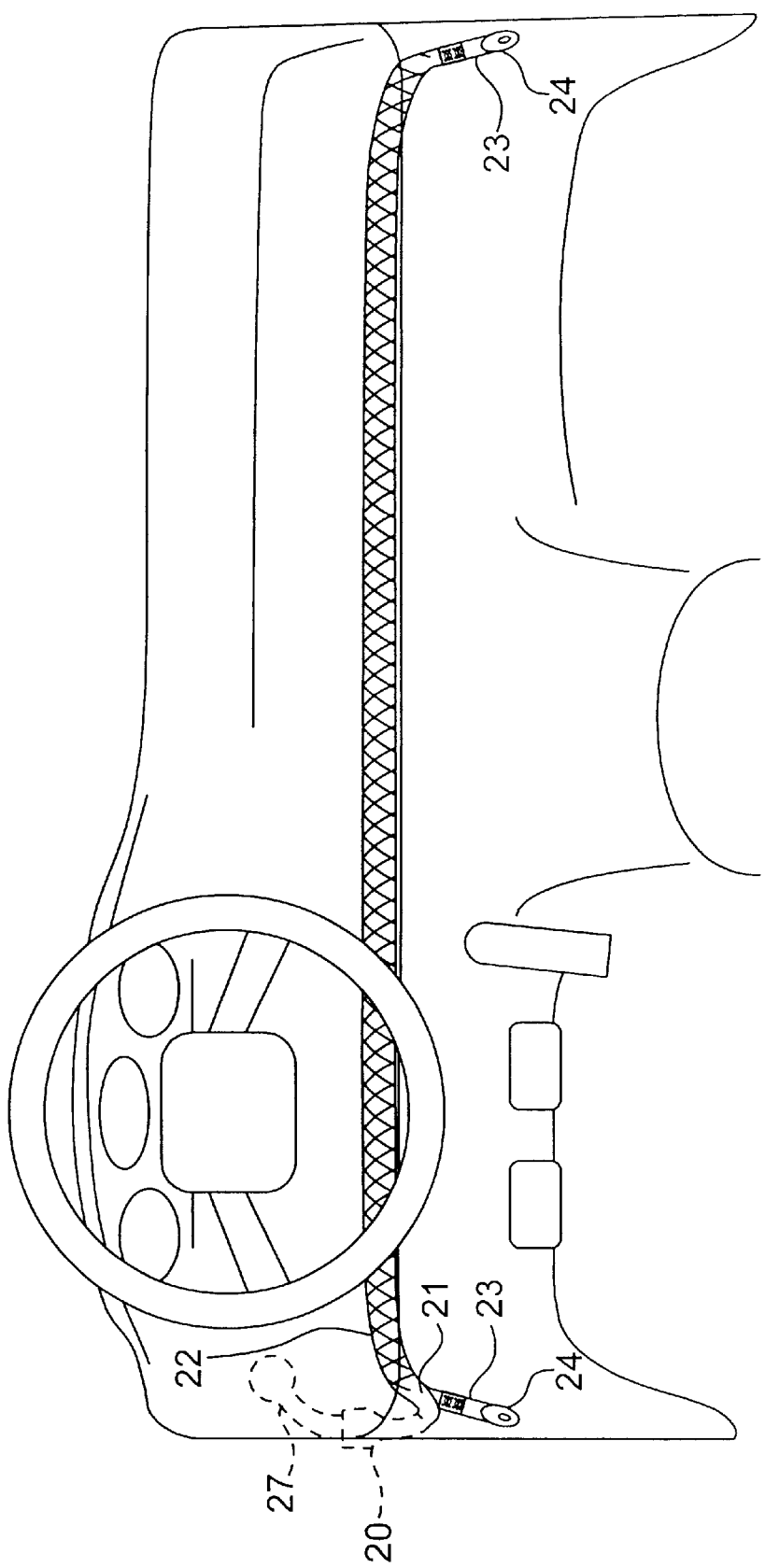
FIG. 5 is a schematic diagram of a top-rear view of a single bolster embodiment of the present invention in its stowed position.
Figure 6:
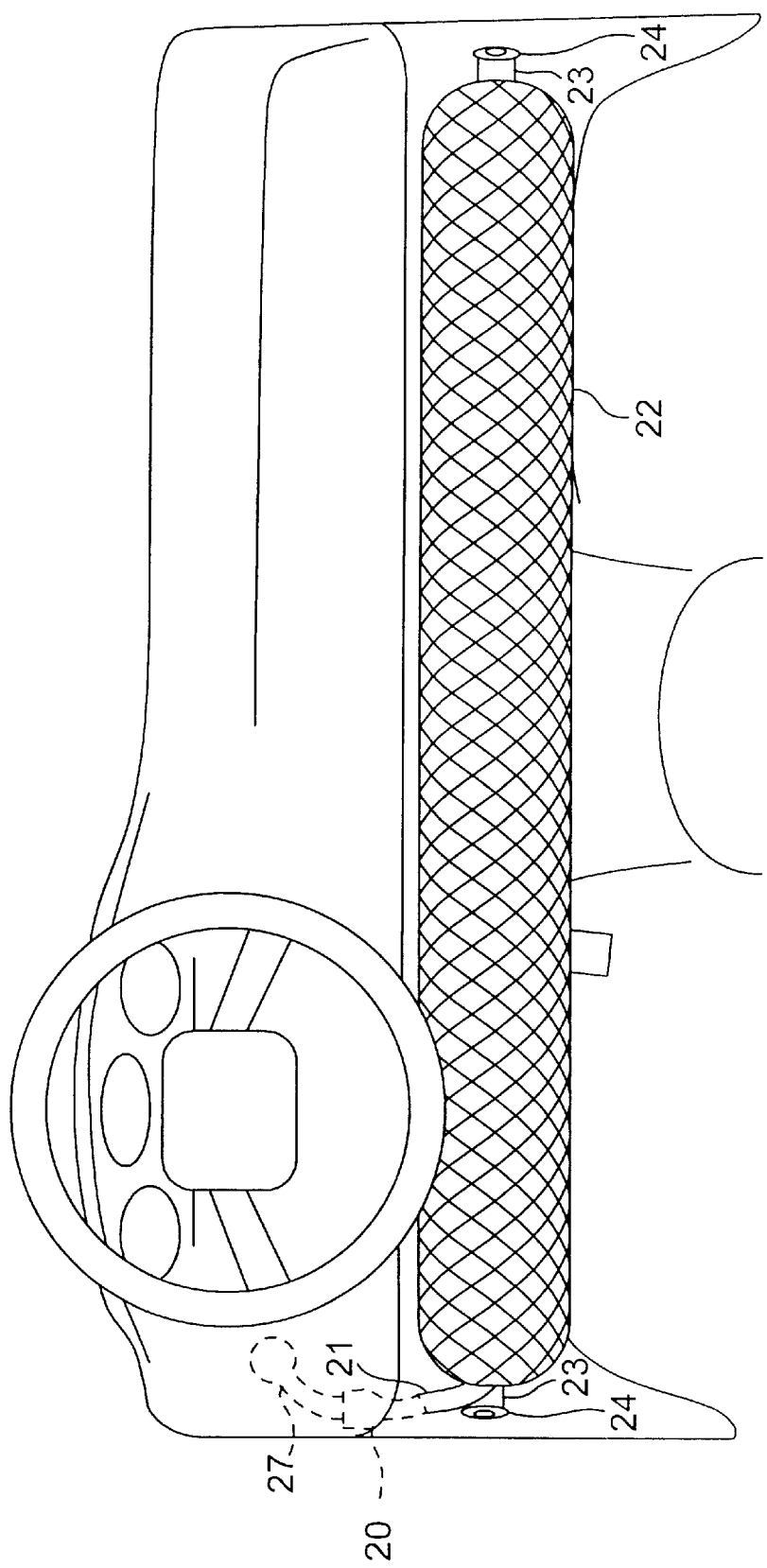
FIG. 6 is a schematic diagram of a top-rear view of an inflated single bolster embodiment of the present invention.
Figure 7:
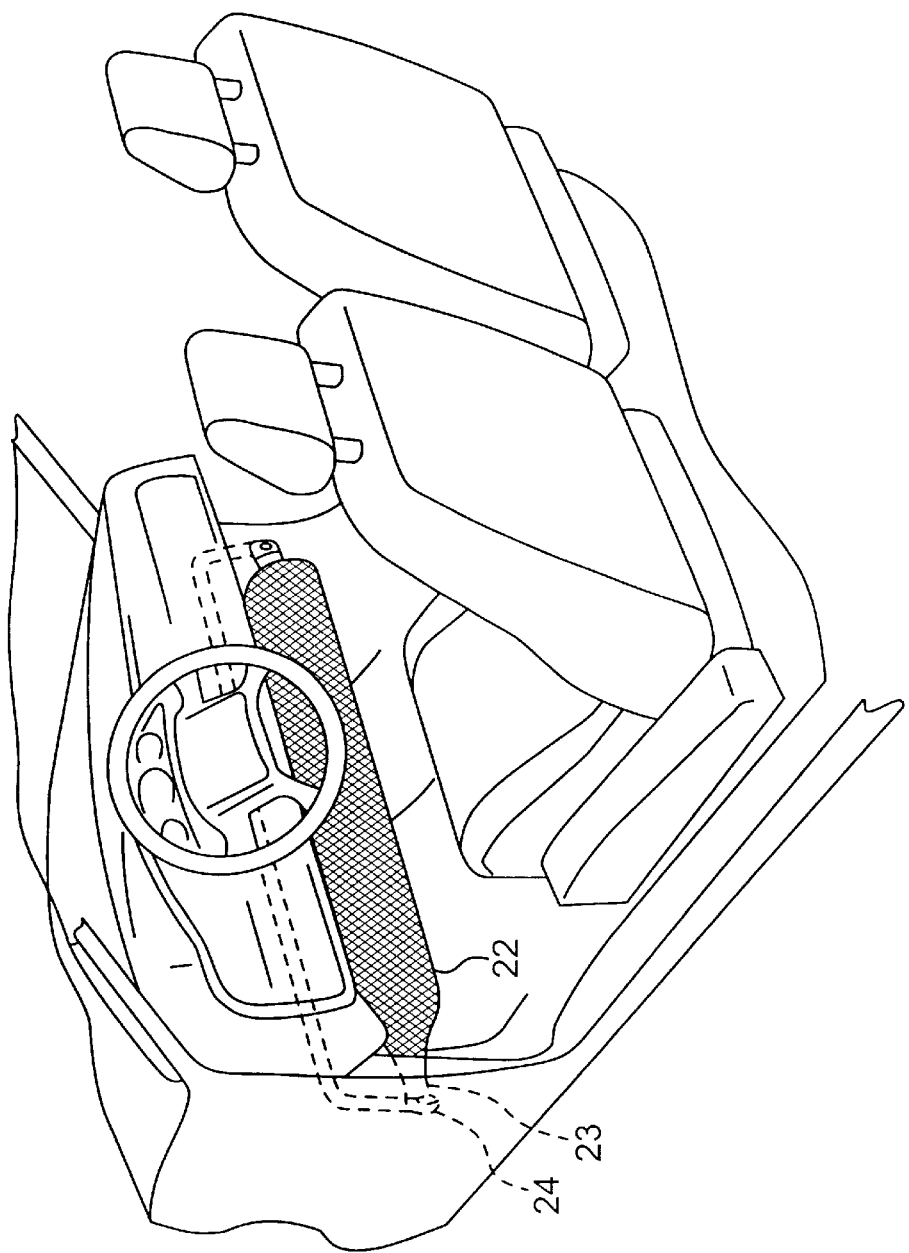
FIG. 7 is a schematic diagram of a top-left oblique view of an inflated single bolster embodiment of the present invention.

FIGS. 5–7 show a single-bolster preferred embodiment of the present invention in its stowed condition (FIG. 5) and after inflation (FIGS. 6–7). FIG. 7 is a perspective view showing the installation of a single bolster system in a passenger compartment of a vehicle. FIGS. 5 and 6 show attachment hardware 24, webbing 23, braided tube 22 and gas conduit 21.

Figure 8:
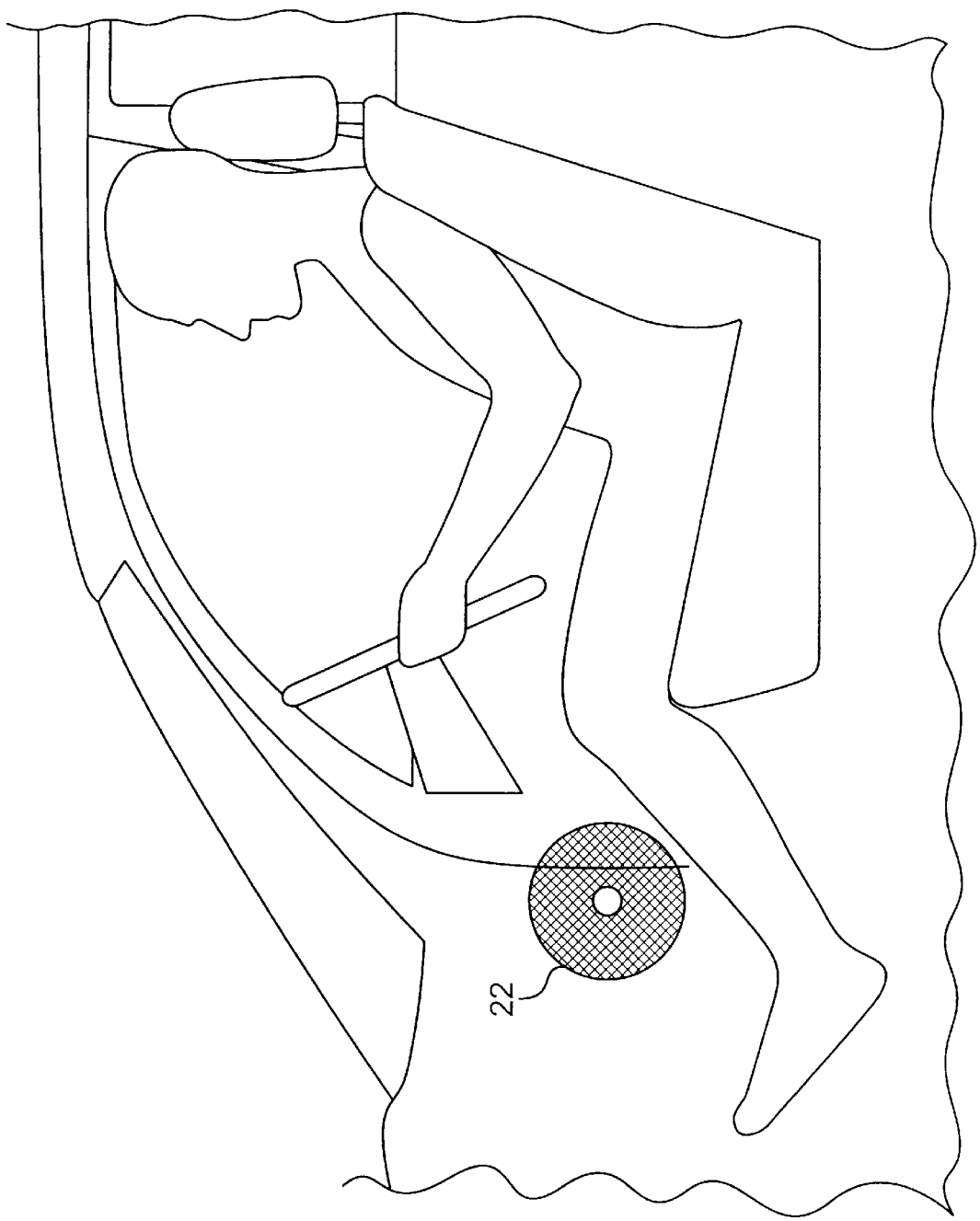
FIG. 8 is a schematic diagram of the side view of the present invention in its inflated configuration.

FIG. 8 is a side view of the present invention in its inflated state, showing the position of braided tube 22 in relation to an occupant.

Gas generator(s) 20 preferred for this invention is of conventional construction for use with an inflatable tubular restraint. Gas generator 20 receives a signal from crash sensor 27 to ignite and discharge the gas. The gas generator 20 must fully inflate the braided tube 22 to a relative pressure of approximately 1.5 bars (2.5 bars absolute) within 10 to 15 ms of sensor closure. The gas generator 20 which inflates the unit can be mounted remotely in a convenient location, such as forward in the dashboard using a flexible or combination rigid/flexible gas conduit to this invention. The gas generator 20 is connected to the ITB tube 22 by a gas conduit 21. The other end of the gas conduit 21 is attached through a braided cover 25 and sealed to an inflatable tubular structure liner 26. The braided cover 25 and liner 26 comprise an inflatable tubular structure.

Preferred materials for the high pressure gas conduit 21 include polyester and aramid fibers (for covering). Preferred materials for the liner 26 include urethane or rubber polymers. The gas conduit must be such that it can withstand the pressure of the inflation gas. Fire-hose technology is ideal for the manufacture of the gas conduit 21, as it provides high-burst strength and good flexibility. The preferred diameter of the gas conduit 21 is typically 18 to 30 mm. The preferred length of the conduit 21 is between 20 and 800 mm.

Preferred materials for the braided cover 25 include polyester fibers (regular and high tenacity and low shrink), nylon fibers, and other high strength fibers. This cover 25 is preferably bonded to the gas impermeable liner 26. Preferred materials for the gas impermeable liner 26 include high elongation, high strength elastomers and specially coated, finely woven fabrics. Preferred configuration includes an uninflated diameter for the ITB tubular body 22 of 80 to 800 mm, and an inflated diameter of 200 to 300 mm. The length of the tube 22 depends on size and configuration of the vehicle which it occupies.

Webbing 23 is attached to the unbonded portions of the braided cover 25 at each end of the braided tube 22. Preferred materials for the webbing 23 include polyester and nylon fibers sewn with polyester and nylon thread. The preferred length of the webbing 23 is dependent on the vehicle in which the unit is being installed, but as shown in FIG. 1a, is usually a short strap attached to each end of the inflatable portion of the invention to connect the inflatable portion of the invention to the attachment hardware 24. The preferred width and thickness of the webbing 23 are about 38 to 50 mm and 0.5 to 1.5 mm, respectively. The thread is typically also polyester or nylon fiber.

As shown in FIGS. 1a and 1b, the ITB 30 is fabricated by bonding a gas impermeable, elastomeric or coated fabric liner 26 to a braided cover 25 with thermoplastic or thermoset adhesives such that there are no wrinkles or sags and intimate contact is maintained between the liner 26 and the braided cover 25. A portion of liner 26 measuring 20 to 30 mm in length is left unbonded on each end, while a length of approximately 70 mm of braided cover 25 hangs unbonded past the edge of the liner 26 on each end. A gas conduit 21 (flexible high pressure hose) is fed through the braided cover 25 and inserted into one end of the liner 26 such that the end of the braided cover 25 remains foldable. The ends of the liner 26 are then sealed with one end of the liner 26 sealed around the gas conduit 21. The free, folded ends of the braided cover 25 are sewn to the webbing 23.

The attachment hardware (e.g., buckles or brackets) 24 are then attached to the ends of the webbing 23 for subsequent attachment to the vehicle structure. The attachment hardware 24 is conventional seat belt anchoring hardware, which is typically chrome-plated steel. The unit receives a cover of thin film for protection during handling and stowage. The gas conduit 21 is connected to a gas generator 20 through the generator's housing prior to installation.

In the event of a crash, a crash sensor 27 signals the gas generator 20 to ignite and discharge gas at a high mass flow rate into the gas conduit leading to the ITB 30. The fibers of the braided tube 22 ultimately seek an orientation in which the acute angles at crossing points 28 become obtuse angles and the obtuse angles at crossing points 28 becomes acute angles. As the ITB 30 inflates, its length significantly decreases as its diameter increases. The ITB becomes semi-rigid as inflation completes, and it pulls itself out of its stowed position downward and rearward into its functional position. spanning the open footwell area of the vehicle. Within about 12 to 25 ms after impact, the taut, tubular cushion positions itself in front of the occupant's knees, restrains forward and downward occupant movement, cushions the occupant from impact, and functions as a barrier between the occupant's knees and legs and the vehicle's structure. When the occupant hits the ITB 30, impact forces are transferred to the vehicle's structure through this invention's webbing and hardware. When the impact has passed and the occupant is at rest, he relaxes the load on this invention and is very close to his initial position.

The ITB 30 may contain a vent with a threshold plug (not shown). A vented ITB would begin venting when occupant loading causes a rise in the internal pressure over a predetermined level. Venting allows the unit to absorb additional energy and provide cushioning as the occupant "rides down" the deflating airbag. Different venting mechanisms can be used to produce various deflation rates to keep the ITB 30 inflated longer and thereby provide protection during secondary impacts.

The ITB 30 can be produced in varying lengths, contain gas conduits 21 of different diameters, and be manufactured using various liners 26 including urethane elastomers; silicone rubber; nitrile or butyl rubbers; and fibers including PET, PVA, PBO, PBI, aramids, polyamides, polypropylenes, polyethylenes, natural fibers, and other moderate to high strength fibers.

Figure 9:
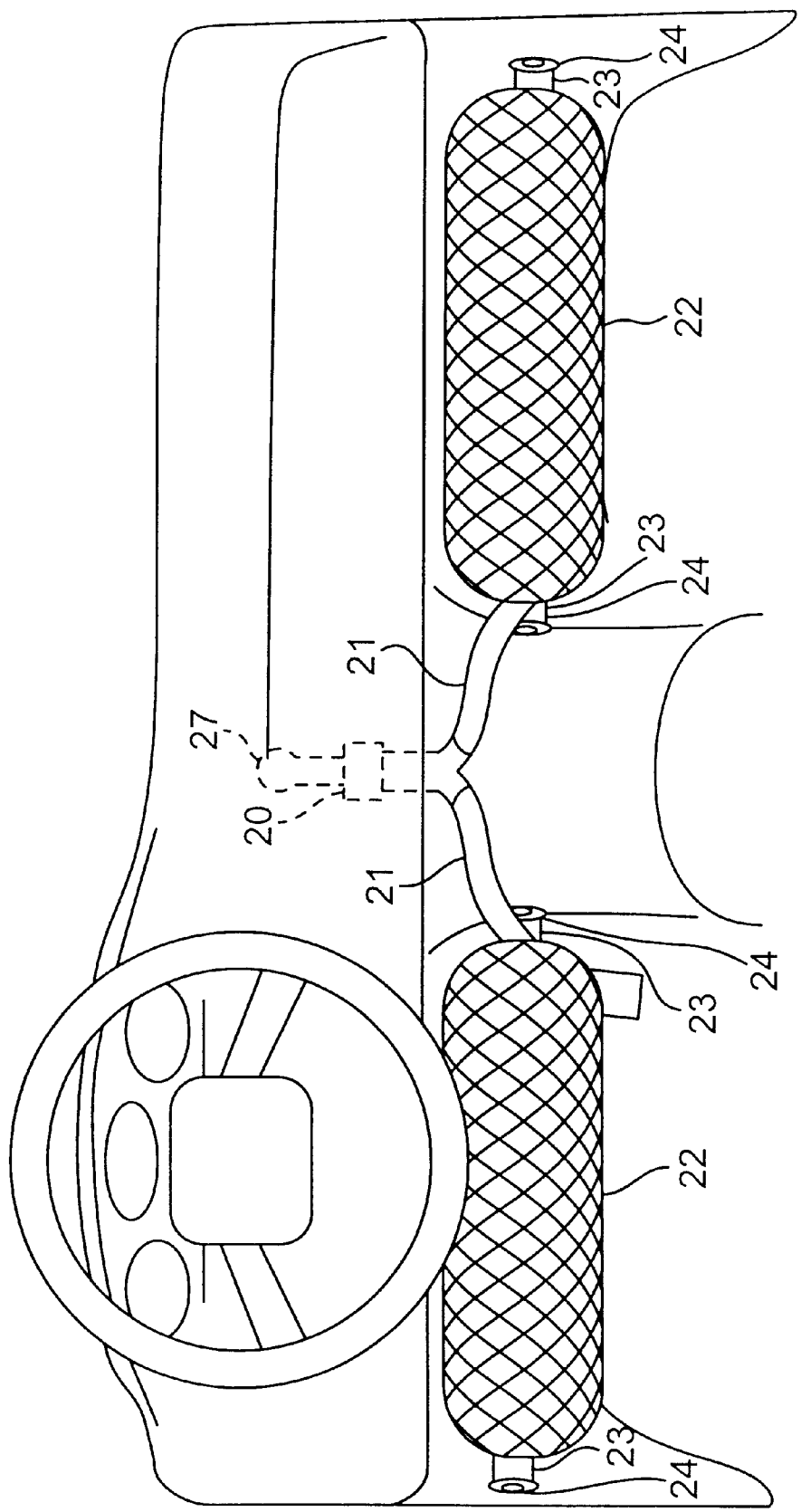
FIG. 9 is a schematic diagram of a top-rear view of an alternate embodiment of the present invention, in its inflated configuration, for a vehicle utilizing a dual bolster system and a single gas generator.

FIG. 9 is a schematic diagram of an alternate embodiment of the present invention, in which a single gas generator 20 is connected by a tee connector to two gas conduits 21, which in turn can be used to inflate two braided tubes 22.

The foregoing disclosure of the preferred embodiments of the invention has been presented for the purposes of illustration and description. It is not intended to be exhaustive or to limit the invention to the precise forms disclosed. In particular, the present invention can be used in other ground vehicles and sea and air crafts in addition to motor vehicles. For example, the present invention may be used in trains, trucks, buses, vans, boats, ships, airplanes and helicopters. Many variations and modifications of the embodiments described herein will be obvious of one of ordinary skill in the art in light of the above disclosure.

We claim:

1. An inflatable tubular bolster for a vehicle comprising:
   (a) an inflatable braided tube of continuous high-strength fibers having a first end and a second end, said tube located beneath a dashboard of said vehicle;
   (b) a first piece of webbing connecting the first end of the braided tube to the vehicle via an attachment means;

(c) a second piece of webbing connecting the second end of the braided tube to the vehicle via an attachment means;

(d) a gas generator fluidly connected to the braided tube via a gas conduit; and;

(e) a crash sensor connected to said gas generator such that when an impact is detected said gas generator causes said inflatable braided tube to be inflated;

wherein as said inflatable tube inflates, said tube is pulled out of a stowed position downward and rearward into a position below said dashboard such that it restrains forward and downward movement of an occupant.

2. The inflatable tubular bolster of claim 1, wherein the continuous high-strength fibers form spirals prior to inflation, and upon inflation by the gas generator, the inflatable braided tube increases its diameter and significantly decreases its length.

3. The inflatable tubular bolster of claim 1, wherein the inflatable braided tube comprises an inner liner.

4. The inflatable tubular bolster of claim 1 wherein upon inflation of said inflatable braided tube high tensile forces are created at said attachment means.

5. The inflatable tubular bolster of claim 1 wherein said inflatable braided tube can inflate to a range of diameters.

6. The inflatable tubular bolster of claim 1 wherein on impact said inflatable braided tube deploys in front of an occupant's knees and inhibits forward and downward movement of said occupant.

7. The inflatable tubular bolster of claim 1, wherein said first piece of webbing is attached to the vehicle near a door and said second piece of webbing is attached to a center tunnel for single occupant use or to an opposite side of said vehicle for multiple occupant use.

8. The inflatable tubular bolster of claim 1 wherein said inflatable braided tube is flat and hidden from sight in its stowed position.

9. A method for protecting occupants of a vehicle comprising the steps of:

(a) attaching a first short strap to a first end of an inflatable braided tube, said inflatable braided tube comprising continuous fibers forming spirals which cross each other at fiber crossing points, and which form acute longitudinal angles at the fiber crossing points;

(b) anchoring said first short strap to said vehicle;

(c) attaching a second short strap to a second part of said inflatable braided tube;

(d) anchoring said second short strap to the vehicle;

(e) detecting an impact; and (f) igniting a gas generator fluidly connected to the inflatable braided tube;

wherein said inflatable braided tube is stowed compactly under a vehicle dashboard and when said inflatable tube inflates, said tube is pulled out of its stowed position downward and rearward such that it restrains forward and downward movement of an occupant.

10. The method of claim 9, comprising the further step of creating high tensile forces where said inflatable tube is anchored to the vehicle upon inflation of said inflatable braided tube.

11. An inflatable tubular bolster for protecting the lower extremities of an occupant during a collision comprising:

(a) an inflatable braided tube of continuous high-strength fibers having a first end and a second end, said tube located beneath a dashboard of a vehicle;

(b) a first piece of webbing connecting the first end of the braided tube to the vehicle via an attachment means located below said dashboard;

(c) a second piece of webbing connecting the second end of the braided tube to the vehicle via an attachment means;

(d) a gas generator fluidly connected to the braided tube via a gas conduit; and (e) a crash sensor connected to said gas generator such that when an impact is detected said gas generator causes said inflatable braided tube to be inflated;

wherein as said inflatable tube inflates, said tube is pulled out of a stowed position into a position spanning an open footwell area of the vehicle.

12. The inflatable tubular bolster of claim 11, wherein the inflatable braided tube moves downward and rearward into the open footwell area of the vehicle upon inflation.

13. The inflatable tubular bolster of claim 11, wherein upon inflation of said inflatable braided tube high tensile forces are created at said attachment means such that the inflatable tubular bolster does not require any additional reactive surface to restrain forward and downward movement of the occupant.

14. A restraint system, for a vehicle including a passenger compartment and a dashboard, comprising:

(a) an inflatable tubular bolster having a braided tube and webbing disposed on first and second ends of the braided tube, and adapted to be attached to the vehicle;

(b) a gas generator in flow communication with the inflatable tubular bolster and capable of inflating the tubular bolster;

(c) wherein the inflatable tubular bolster has a first condition where the inflatable tubular bolster is deflated and stored under the dashboard, the inflatable tubular bolster having a first length in the first condition;

the inflatable tubular bolster having a second condition where the inflatable tubular bolster is inflated and deployed, the inflatable tubular bolster having a second length in the second condition; and wherein the first length is greater than the second length.

15. The restraint system according to claim 14, wherein the inflatable bolster includes a liner.

16. The restraint system according to claim 15, wherein the liner is constructed of an elastomeric material and is attached to the braided tube by bonding the liner with thermoplastic or thermoset adhesives.

17. The restraint system according to claim 14, wherein a gas conduit connects the gas generator with the inflatable bolster.

18. The restraint system according to claim 14, wherein the inflatable bolster is attached to the vehicle using anchoring hardware.

19. A restraint system, for a vehicle including a passenger compartment and a dashboard, comprising:

(a) an inflatable tubular bolster having a braided tube and webbing disposed on first and second ends of the braided tube, and adapted to be attached to the vehicle;

(b) a gas generator in flow communication with the inflatable tubular bolster and capable of inflating the tubular bolster;

(c) wherein the inflatable tubular bolster has a first condition where the inflatable tubular bolster is deflated and stored under the dashboard, the inflatable tubular bolster having a first rigidity in the first condition;

the inflatable tubular bolster having a second condition where the inflatable tubular bolster is inflated and deployed, the inflatable tubular bolster having a second rigidity in the second condition; and wherein the second rigidity is greater than the first rigidity.

20. The restraint system according to claim 19, wherein the inflatable bolster attains an internal pressure of approximately 1.5 bars after inflation.

21. The restraint system according to claim 19, wherein the inflatable bolster attains a rigidity after inflation that is sufficient to independently restrain excessive forward motion by an occupant without rear backing or support.

22. The restraint system according to claim 19, wherein said inflatable bolster has a diameter of 80 to 800 mm in the first condition.

23. The restraint system according to claim 19, wherein said inflatable bolster has a diameter of 200 to 300 mm in the second condition.

24. The restraint system according to claim 19, wherein the inflatable bolster is pivotally connected to the vehicle at a first end.

25. The restraint system according to claim 24, wherein the inflatable bolster is pivotally connected to the vehicle at a second end.

26. The restraint system according to claim 25, wherein the inflatable tubular bolster includes a first piece of webbing disposed at the first end and a second piece of webbing disposed at the second end.

27. The restraint system according to claim 26, wherein the inflatable bolster includes hardware at the first and second ends adapted to connect the inflatable bolster to the vehicle and permit the inflatable bolster to pivot relative to the vehicle.

28. A restraint system, for a vehicle including a passenger compartment and a dashboard, comprising:

(a) an inflatable tubular bolster pivotably attached to the vehicle;

(b) a gas generator in flow communication with the inflatable bolster and capable of inflating the tubular bolster;

(c) wherein the inflatable bolster has a first condition where the inflatable bolster is deflated and stored underneath the dashboard and out of sight of an occupant;

the inflatable bolder having a second condition where the inflatable bolster is inflated and deployed, the inflatable bolster having an increased diameter in the second condition and a decreased length in the second condition; wherein the inflatable bolster is capable of providing protection to the occupant without a reactive surface when the inflatable bolster is in the second condition.

29. A method for deploying an inflatable tubular bolster comprising the steps of:

(a) installing the inflatable tubular bolster beneath a lower face of a dashboard;

(b) receiving a signal from a crash sensor;

(c) igniting a gas generator and discharging a gas into the inflatable tubular bolster at a mass flow rate in response to the signal; and (d) inflating the inflatable tubular bolster in response to the gas such that the inflatable tubular bolster pulls itself out of a stowed position and eventually reaches a functional position that is downward and rearward of the stowed position.

30. The method according to claim 29, wherein the step of inflating the inflatable tubular bolster is accomplished with a single gas generator and a tee connector to two gas conduits which in turn inflate two inflatable tubular bolsters.

* * * * *